(12) United States Patent
Mundkur

(10) Patent No.: US 12,373,010 B2
(45) Date of Patent: Jul. 29, 2025

(54) POWER EFFICIENT COMPUTER AND DISPLAY FOR USE IN A POWER-OVER-ETHERNET SYSTEM

(71) Applicant: Jagdish Ramesh Mundkur, Yardley, PA (US)

(72) Inventor: Jagdish Ramesh Mundkur, Yardley, PA (US)

(*) Notice: Subject to any disclaimer, the term of this patent is extended or adjusted under 35 U.S.C. 154(b) by 171 days.

(21) Appl. No.: 18/310,519

(22) Filed: May 1, 2023

(65) Prior Publication Data
US 2024/0338060 A1    Oct. 10, 2024

Related U.S. Application Data

(63) Continuation-in-part of application No. 18/131,352, filed on Apr. 5, 2023.

(51) Int. Cl.
*G06F 1/18* (2006.01)
*G06F 1/20* (2006.01)

(52) U.S. Cl.
CPC ............. *G06F 1/189* (2013.01); *G06F 1/184* (2013.01); *G06F 1/20* (2013.01)

(58) Field of Classification Search
None
See application file for complete search history.

(56) References Cited

U.S. PATENT DOCUMENTS

| | | | |
|---|---|---|---|
| 7,155,622 B2 | 12/2006 | Mancey et al. | |
| 7,706,392 B2 | 4/2010 | Ghoshal et al. | |
| 7,941,677 B2 | 5/2011 | Penning | |
| 8,310,089 B2 | 11/2012 | Schindler et al. | |
| 9,880,598 B2 | 1/2018 | Luerkens et al. | |
| 11,411,293 B1* | 8/2022 | Putman | ...................... H01P 5/16 |
| 2004/0148060 A1 | 7/2004 | Lee | |
| 2006/0117089 A1 | 6/2006 | Karam | |
| 2007/0170909 A1 | 7/2007 | Vorenkamp et al. | |
| 2007/0260904 A1 | 11/2007 | Camagna et al. | |
| 2007/0288784 A1 | 12/2007 | Koper et al. | |

(Continued)

FOREIGN PATENT DOCUMENTS

| | | |
|---|---|---|
| CN | 101834755 | 9/2010 |
| CN | 207283589 | 4/2018 |

(Continued)

*Primary Examiner* — Fahmida Rahman
(74) *Attorney, Agent, or Firm* — LAMORTE & Associate P.C

(57) ABSTRACT

A system and method of a powered device for use in a Power-over-Ethernet system. The powered device has a computer device and at least one display monitor. The computer unit has an input port for receiving a PoE cable and the mixed power/data signal it carries. The computer unit contains a splitter circuit board for separating the mixed power/data signal into a power signal and a data signal. The computer signal also carries a motherboard and microprocessor that receives the data signal and generates display images for the monitors. The monitors are powered by the power signal output by the splitter circuit board and display the image signals generated by the microprocessor. The computer unit and each of the monitors power up using a staggered startup timeline. In this manner, the overall power being drawn does not exceed the power available in the PoE system.

19 Claims, 7 Drawing Sheets

(56)     References Cited

U.S. PATENT DOCUMENTS

| | | |
|---|---|---|
| 2008/0067871 A1 | 3/2008 | Black et al. |
| 2008/0068519 A1 | 3/2008 | Adler et al. |
| 2010/0223480 A1 | 9/2010 | Fratti et al. |
| 2012/0265361 A1 | 10/2012 | Billingsley et al. |
| 2013/0173937 A1 | 7/2013 | Lee |
| 2013/0307323 A1 | 11/2013 | Hasenei |
| 2016/0028655 A1 | 1/2016 | Alsup |
| 2016/0041573 A1 | 2/2016 | Chen et al. |
| 2016/0132086 A1* | 5/2016 | Hong ............... H04L 67/10 713/300 |
| 2017/0220101 A1 | 8/2017 | Brooks et al. |
| 2018/0375672 A1* | 12/2018 | Thiers ............ H04L 12/40006 |
| 2019/0180586 A1* | 6/2019 | Script ..................... G06T 7/50 |
| 2022/0262530 A1 | 8/2022 | Mansfield et al. |

FOREIGN PATENT DOCUMENTS

| | | |
|---|---|---|
| CN | 109617039 | 2/2021 |
| DE | 102006036770 | 2/2008 |
| EP | 1 708 409 | 10/2006 |
| EP | 3021212 A1 | 5/2016 |
| JP | 2007088809 | 4/2010 |
| JP | 2011103034 | 5/2011 |

\* cited by examiner

POWER EFFICIENT COMPUTER AND DISPLAY FOR USE IN A POWER-OVER-ETHERNET SYSTEM

RELATED APPLICATIONS

This application is a continuation-in-part of co-pending U.S. patent application Ser. No. 18/131,352, filed Apr. 5, 2023.

BACKGROUND OF THE INVENTION

1. Field of the Invention

In general, the present invention relates to Power-over-Ethernet (PoE) systems that provide both power and data to electronic devices. More particularly, the present invention relates to low powered computers with microprocessors and one or more displays that are designed for use in a PoE system.

2. Prior Art Description

As electronics and programming become more sophisticated in a widening array of devices, an ever-increasing number of devices have the ability to exchange data with a local area network (LAN). Exchanging data with a LAN can be accomplished either wirelessly or by using a cable connection to an Ethernet network. If a cable connection is used, the cable is typically a twisted pair cable, such as a Cat5 cable, a Cat5e cable, or a Cat6 cable.

Traditional devices that connect to an Ethernet network require a wiring infrastructure that contains both a power receptacle and an Ethernet cable. The power receptacle is coupled to the power grid and provides AC power at 120 volts and 60 Hz in the United States. The powered device typically contains an AC/DC converter that converts the incoming AC power to the operational DC voltage utilized by the internal electronics. The separate Ethernet cable is used to exchange data via DC signals to a modem or other access port to the LAN.

Providing both a power receptacle and an Ethernet cable to a particular position in a building is not always convenient. This is particularly true since the number of power receptacles on a circuit, and the positions in which power receptacles can be installed, are subject to various local and state building codes.

It is for these reasons that Power-over-Ethernet (PoE) systems have been developed. PoE systems provide both electrical power and data communications over an Ethernet cable. In this manner, only one Ethernet cable needs to be provided at a particular location. Furthermore, the electrical power provided via the Ethernet cable is DC. As such, the need for an AC/DC converter is eliminated and the overall electronics package can be made smaller.

There are several common techniques for transmitting power over Ethernet cabling. Three of them have been standardized by the Institute of Electrical and Electronics Engineers (IEEE) standard IEEE 802.3. These standards are known as alternative A, alternative B, and 4PPoE. Of the three standardized types, 4PPoE, also known as PoE++, has the ability to provide the most power to a device. The IEEE standard for a 4PPoE system can handle up to 100 watts of power at the source and 71.3 watts at the load. This enables the 4PPoE cable to extend up to 100 meters. The voltage limit is between 52 volts and 75 volts at the source and between 41.1 volts and 57 volts at the load. The maximum current that can be transmitted is 960 mA per twisted wire pair within the Ethernet cable. Most Ethernet cables utilize thin wire that is between 24 AWG and 26 AWG. As such, the wire can rapidly heat if the maximum current limit is surpassed.

Given the voltage and current limitations of a 4PPoE system, only certain types of electronic devices are eligible for use with the system. The devices must be able to operate using DC voltage and draw no more than 71.1 watts during all phases of operation. Since this limit is the maximum, the actual limit used in industry is at least ten percent less, or approximately 64 watts, to account for some margin of error. This limitation in available wattage is substantial. For example, suppose a traditional personal computer with a display screen is to be operated using a 4PPoE system. As the computer boots up, there is a peak in current draw as fans activate, network handshake signals are processed, the operating system begins to run, and the various electronics become active and heat. According to specifications, an exemplary computer motherboard with an Intel® i5 8400 processor will draw about 54 watts at startup of a desktop computer. The fans used to cool the microprocessor consume approximately 6 watts. Thus, the startup of a traditional personal computer processor alone utilizes nearly all the power available in a 4PPoE system. There is no extra power to activate display monitors, speakers, keyboard mouses and the like. Accordingly, the only options are to utilize a traditional 120-volt power receptacle or to severely limit the processing power, display screen and/or peripherals of the computer.

Power consumption is minimized in a laptop computer in order to operate the computer using the limited power available in the battery of the laptop. Power is saved by using a small display screen, miniature cooling fans, small speakers and an integrated keyboard. By integrating the screen, keyboard, mouse, and other peripherals, there are no external wiring or separate power supplies that consume power. However, even a small laptop can draw more than 64 watts depending upon the processing power, screen size, and hard drive of the laptop computer.

Since the power available through a 4PPoE system is limited, complex computer systems with large screen systems or multiscreen systems are unavailable in the prior art. Any system that uses a large display monitor, or multiple display monitors simply cannot be operated because the computer consumes most of the power available, therein leaving too little to operate any large of complex displays in conjunction with the computer.

A need therefore exists for a computer system that is specifically designed for use in a PoE system, wherein the computer is powerful and the displays are large, multiple or otherwise complex. This need is met by the present invention as described and claimed below.

SUMMARY OF THE INVENTION

The present invention is a powered device for use in a Power-over-Ethernet system, wherein the Power-over-Ethernet system provides a mixed power and data signal to the powered device through a single PoE cable. The powered device includes a computer device and at least one display monitor. The computer unit has an input port for receiving the PoE cable and the mixed power/data signal it carries. The computer unit contains a splitter circuit board for separating the mixed power/data signal into a power signal and a data signal. The computer signal also carries a motherboard and microprocessor that receives the data signal and generates display images for the monitors.

The monitors are powered by the power signal output by the splitter circuit board and display the image signals generated by the microprocessor. The computer unit and each of the monitors power up using a staggered startup timeline. In this manner, the overall power being drawn does not exceed the power available in the PoE system.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system and methodology can be embodied in many ways, only two exemplary embodiments are illustrated. The exemplary embodiments are being shown for the purposes of explanation and description. The exemplary embodiments are selected in order to set forth two of the best modes contemplated for the invention. The illustrated embodiments, however, are merely exemplary and should not be considered limitations when interpreting the scope of the appended claims.

Figure 1:
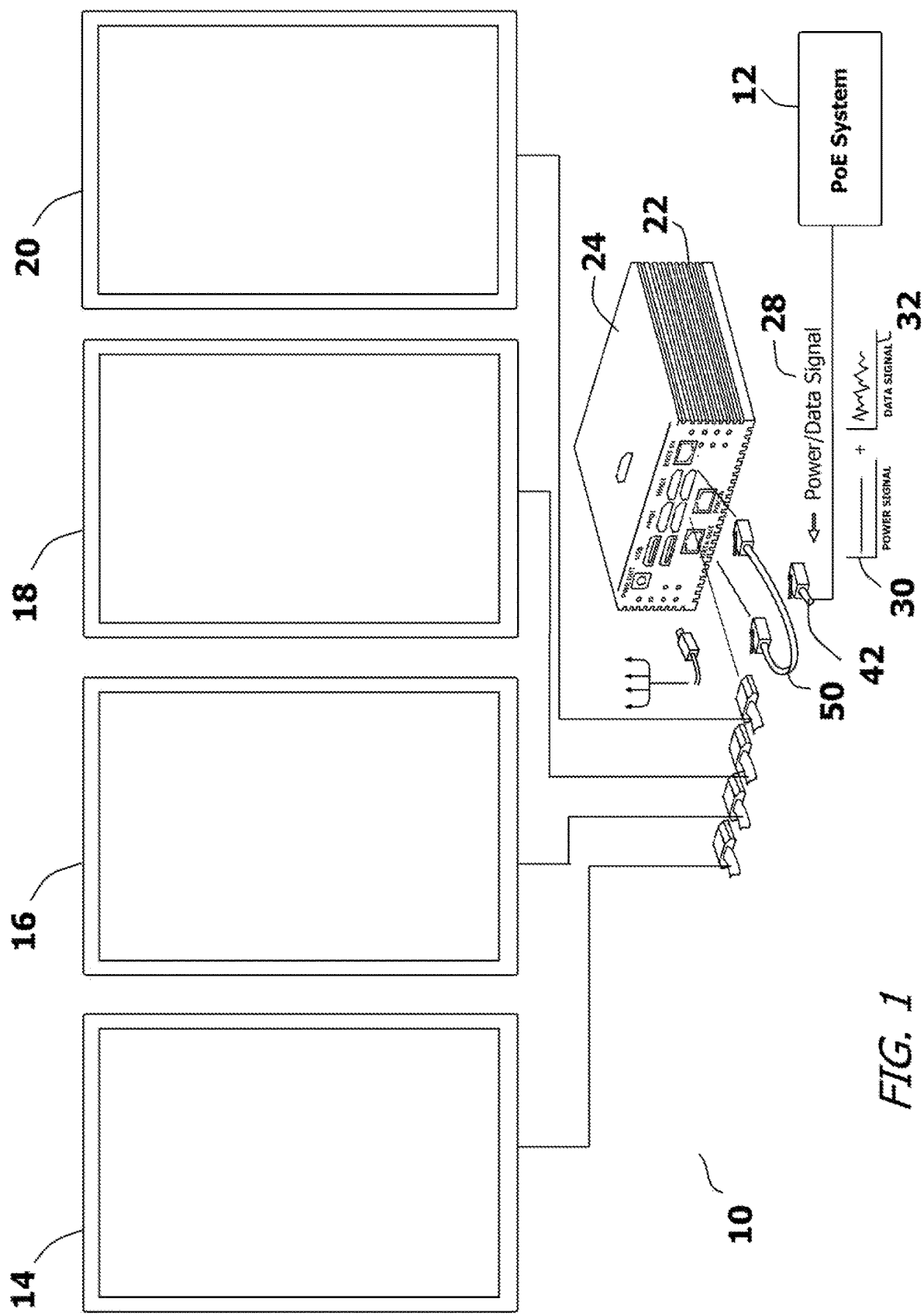
FIG. 1 shows an exemplary embodiment of a powered device in the form of a low power computer unit that has multiple monitors.

Referring to FIG. 1, a commercial display system 10 is shown. The commercial display system 10 is designed to operate as part of a PoE system 12. The exemplary commercial display system 10 being shown contains a plurality of monitors 14, 16, 18, 20. Such displays systems are commonly used in airports, train stations, offices, restaurants, and the like. In such applications, the signage systems are typically mounted to a wall or to an overhead display.

The monitors 14, 16, 18, 20 are dumb monitors. That is, the monitors 14, 16, 18, 20 depends on a separate low power computer unit 22 for processing. Each of the monitors 14, 16, 18, 20 act as a simple input/output device when connected directly to a low power computer unit 22. Furthermore, each of the monitors 14, 16, 18, 20 are designed to operate at the DC voltage provided through the PoE system 12. Accordingly, the monitors 14, 16, 18, 20 do not require AC/DC power converters, which draw a substantial amount of power in a traditional computer monitor.

The low power computer unit 22 is specifically designed to operate within the PoE system 12. The low power computer unit 22 is very small, having a shell housing 24 with an internal capacity of between 50 cubic inches and 100 cubic inches. This small size enables the low power computer unit 22 to be mounted to walls, ceilings and even in junction boxes in an unobtrusive manner. The low power computer unit 22 does not have an integrated user interface and contains no fans or other peripheral devices that are not directly required to operate the monitors 14, 16, 18, 20. Thus, the low power computer unit 22 is dedicated to the operation of the monitors 14, 16, 18, 20 and to providing image signals to the monitors 14, 16, 18, 20.

Figure 2:
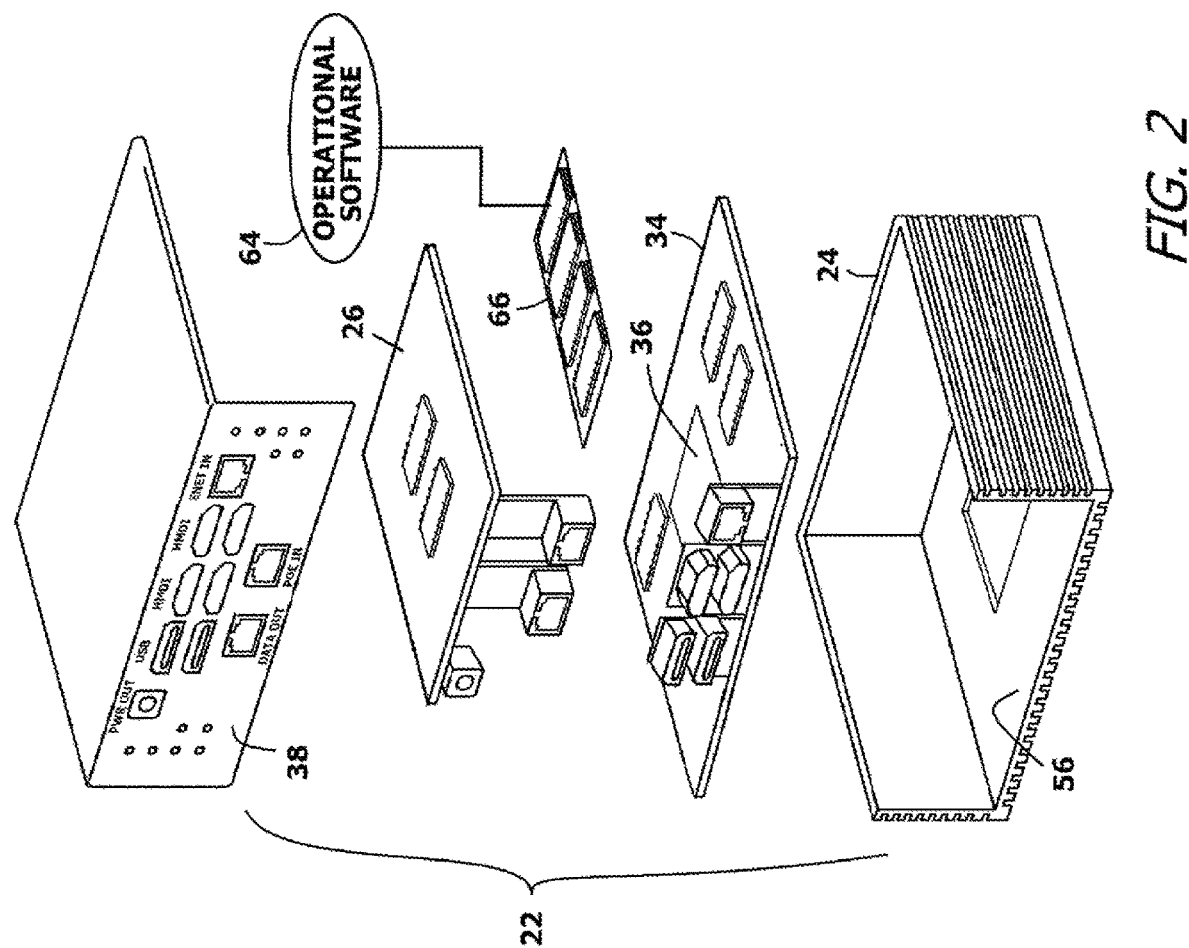
FIG. 2 is an exploded view of the low power computer unit used in FIG. 1.
Figure 3:
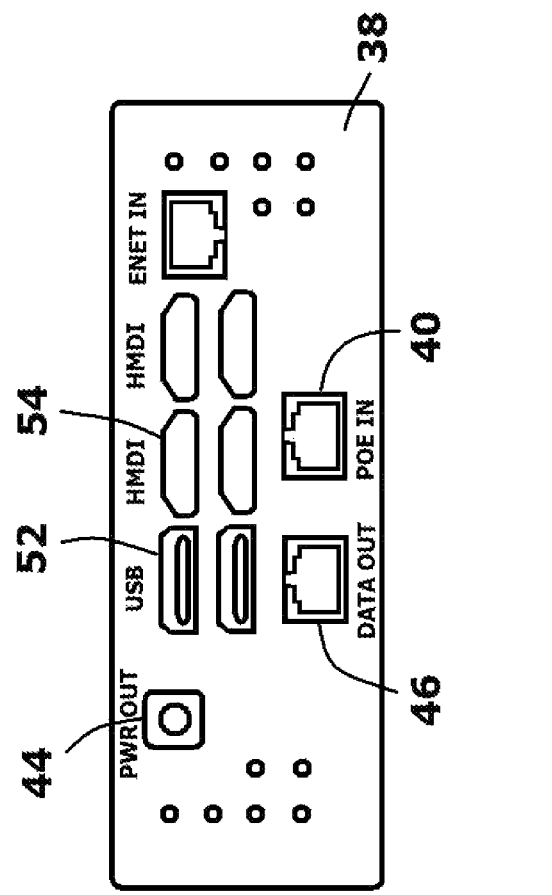
FIG. 3 is a front view of the connector panel on the exemplary low power computer unit.

Referring to FIG. 2 and FIG. 3 in conjunction with FIG. 1, it will be understood that within the low power computer unit 22, there are two primary circuit board assemblies. The first circuit board assembly is a splitter circuit board assembly 26. The PoE system 12 provides a mixed power/data signal 28 to the low power computer unit 22. The mixed power/data signal 28 contains a DC power signal 30 and a data signal 32. The splitter circuit board assembly 26 separates the DC power signal 30 from the data signal 32. The second primary circuit board assembly contained within the low power computer unit 22 is a motherboard 34, which supports the operation of a microprocessor 36.

The low power computer unit 22 has a connector panel 38. The connector panel 38 includes a PoE cable port 40 that receives a single twisted pair PoE cable 42 from the PoE system 12. The low power computer unit 12 receives the mixed power/data signal 28 through the PoE cable port 40. The connector panel 38 also contains a power output port 44 and a data output port 48. The DC power signal 30 is separated from the mixed power/data signal 28 and is directed to the power output port 44. The data signal 32 is separated from the mixed power/data signal 28 and is directed to the data output port 46. The PoE cable port 40, the power output port 44, and the data output port 46 are all hardwired ports supported by the splitter circuit board assembly 26.

The motherboard 34 also has input and output ports that are accessible at the contact panel 38. The motherboard 34 has a data input port 48 that is intended to receive the data signal 32 that was isolated by the splitter circuit board assembly 26. Accordingly, a jumper cable 50 can be used to interconnect the data output port 46 of the splitter circuit board assembly 26 to the data input port 48 of the motherboard 34. In alternate embodiments, the jumper cable 50 can be replaced by an internal ribbon cable within the confines of the shell housing 24. Other traditional motherboard data input/output ports can also be provided, such as USB ports 52 and HDMI ports 54. The HDMI ports 54 connect to the monitors 14, 16, 18, 20 and are used to transmit uncompressed video data to the monitors 14, 16, 18, 20.

Figure 4:
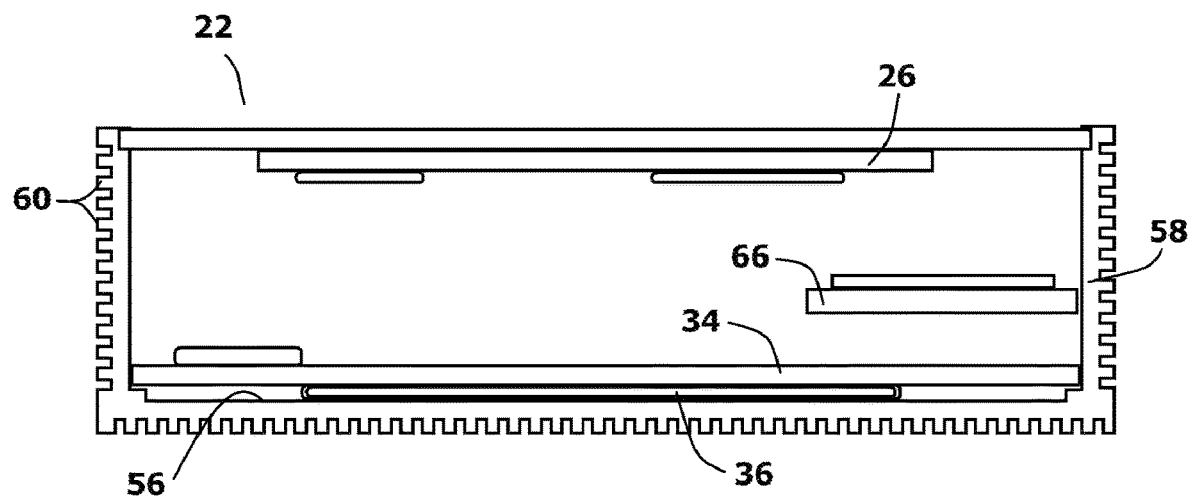
FIG. 4 is a cross-sectional view of the low power computer unit.

Within the low power computer unit 22, a microprocessor 36 is connected to the motherboard 34. The shell housing 24 of the low power computer unit 22 is made of aluminum, or another highly heat conductive material, and is designed to act as the heat sink for the microprocessor 36. Referring to FIG. 4 in conjunction with FIG. 2 and FIG. 3, it can be seen that the shell housing 24 has a bottom surface 56 and side surfaces 58. The exteriors of the bottom surface 56 and the side surfaces 58 are extruded to contain a plurality of parallel heat exchange fins 60. The heat exchange fins 60 exchange heat with the ambient air. Inside the shell housing 24 of the low power computer unit 22, the shell housing 24 supports the motherboard 34 so that the microprocessor 36 abuts against the bottom surface 56 of the shell housing 24. In such a position, the microprocessor 36 can directly conduct heat into the shell housing 24. The shell housing 24, therefore, acts as a heat sink, wherein heat produced by the microprocessor 36 is absorbed by the shell housing 24 and is dissipated into the surrounding environment via the heat exchange fins 60.

In addition to the splitter circuit board assembly 26 and the motherboard 34, the low power computer unit 22 contains a memory module 62, such as a Dual In-Line Memory Module (DIMM) or a Load-Reduced DIMM (LRDIMM), that is capable of storing operational software 64.

In operation, the low power computer unit 22 is connected to an existing PoE system 12. As such, the low power computer unit 22 receives the mixed power/data signal 28 utilized by the PoE system 12. The mixed power/data signal 28 is received at the PoE cable port 40 of the splitter circuit board assembly 26. The splitter circuit board assembly 26 separates the DC power signal 30 from the data signal 32. The DC power signal 30 is directed to the power output port 44. The monitors 14, 16, 18, 20 connect to the power output port 44 and receive the DC power signal through the power output port 44.

The data signal 32 is forwarded to the data output port 46 on the splitter circuit board assembly 26. The jumper cable 50 is then used to connect the data output port 46 of the splitter circuit board assembly 26 to the data input port 48 of the motherboard 34. The motherboard 34 and the microprocessor 36 it supports now have a data connection to the PoE system 12. Using the operational software 64, the microprocessor 36 utilizes the data connection to select and format the video data that is to be displayed on the monitors 14, 16, 18, 20.

Figure 5:
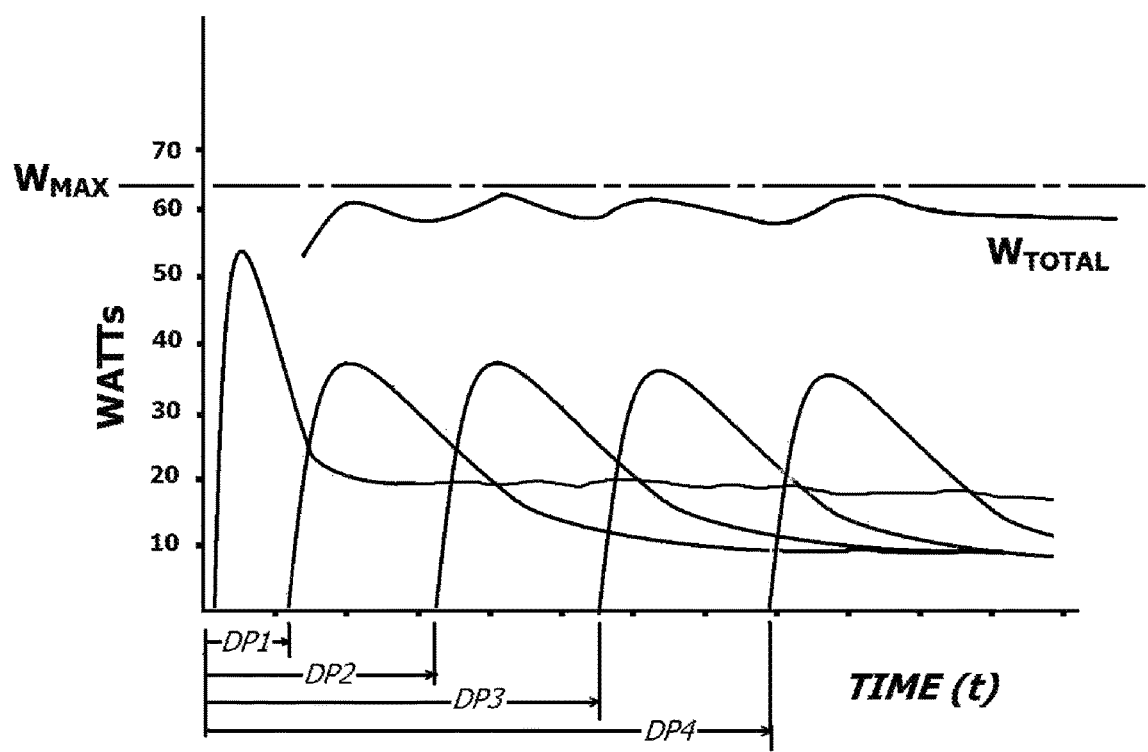
FIG. 5 shows a graph displaying the power consumption rate for the low power computer unit and the displays connected to the low power computer unit.

The illustrated embodiment has a low power computer unit 22 and the four monitors 14, 16, 18, 20 are all powered from a single Ethernet cable 42. Referring to FIG. 5 in conjunction with FIG. 1, it will be understood that when the low power computer unit 22 is first turned on, the power requirements of the low power computer unit 22 peak. FIG. 5 shows a first graph line 70 that represents the power consumption of the low power computer unit 22 over a short period of time during and just after startup. The first graph line 70 shows that there is a spiked startup period 72 where more than fifty watts can be drawn. This spiked startup period 72 is short lived, and typically lasts for between ten seconds and thirty seconds for a motherboard 34 with a modern microprocessor 36. During this spiked startup period 72, the microprocessor 36 runs its Basic Input/Output System, also known as the system BIOS. The system BIOS is firmware that provides runtime services for operating systems and programs and provides hardware initialization during the startup process.

When each of the four monitors 14, 16, 18, 20 power up, the power requirements peak. FIG. 5 shows four additional graph lines 74, 76, 78, 80 that represent the power consumption of the four monitors 14, 16, 18, 20 over a short period of time during and just after startup. During startup, each monitor 14, 16, 18, 20 can draw more than twenty watts. This is nearly double the average operating power drawn by the same monitor once operational. The startup period for each monitor 14, 16, 18, 20 is short lived, and typically lasts for between five seconds and fifteen seconds depending upon the size and resolution of the monitor.

The starting times of the low power computer unit 22 and the monitors 14, 16, 18, 20 are staggered. Instead of starting the low power computer unit 22 and the monitors 14, 16, 18, 20 all at the same time, the startup of these components is choreographed so that the wattage drawn at any one time is below the maximum threshold of rating of the PoE system 12. The delays embodied within the staggered start can be controlled by being elongated or shortened. In this manner, the system can be tuned to the requirements of a particular system or to changes in regulations. For example, in a 4PPoE system, the maximum power rating is just over 71 watts. Some building codes may require a safety factor of ten percent, resulting in a maximum wattage of approximately 64 watts. This recommended safety factor may be different in other states or may be updated over time to fifteen percent or twenty percent, for example. Such changes can be accommodated by elongating the overall startup sequence. Likewise, monitors may break and be replaced with newer monitors that may draw more or less power than the original monitor.

The first component to begin to power up is the low power computer unit 22, more particularly, the motherboard 34 and the microprocessor 36. Since the low power computer unit 22 has no fans, no peripherals, and no AC/DC power converters, the low power computer unit 22 can boot up with a peak power draw of under 50 watts and an average operational draw of approximately 20 watts+/−5 watts depending upon the microprocessor 36 selected. Each of the monitors 14, 16, 18, 20 may require up to 20 watts at startup, but rapidly reduce power needs to approximately 10-15 watts depending upon monitor size and resolution.

As the first monitor 14 is awakened and begins to power up, it creates the power consumption profile represented by a second graph line 74. The monitor startup period of the second graph line 74 overlaps the motherboard startup period in time of the first graph line 70 by a degree governed by the first delay period DP1. The total power peak ($W_{TOTAL}$) at all times (t) is designed not to exceed the maximum operational wattage (Wmax). The longer the first delay period DP1, the shorter the overlap. Within the overlap, the total power consumption is the sum of the power consumption of the low power computer unit 22 and the power consumption of the first monitor 14 at any given time (t). The total power consumption, therefore, can be maintained below the maximum operational wattage (Wmax) through the control of the first delay period DP1.

As the first monitor 14 powers up, the demands of power decrease. This is shown where the second graph line 74 of the first monitor's power consumption reaches a peak and begins to descend. A second delay period DP2 is set. After the second delay period DP2, the startup of the second monitor 16 begins. As soon as the second delay period DP2 passes, the second monitor 16 begins to power up. This creates the power consumption profile represented by a third graph line 76. The third graph line 76 has a second monitor startup period that overlaps the first monitor startup period and some of the stabilizing first graph line of the low power computer unit 22. The second monitor startup period overlaps the first monitor startup period in time by a degree governed by the second delay period DP2. The total power peak ($W_{TOTAL}$) at all times (t) is designed not to exceed the maximum operational wattage (Wmax). Within the overlap, the total power consumption is the sum of the power consumption of the low power computer unit 22, the power consumption of the first monitor 14, and the power consumption of the second monitor 16 at any given time (t). The total power consumption, therefore, can be maintained below the maximum operational wattage (Wmax) through the control of the second delay period DP2.

As the second monitor powers up, the demands of power decrease. This is shown where the third graph line 76 of the second monitor's power consumption reaches a peak and begins to descend. A third delay period DP3 is set. At the third delay period DP3 after startup, the screen startup for the third monitor 18 begins. As the third monitor 18 is awakened and begins to power up, it creates the power consumption profile represented by a fourth graph line 78. The fourth graph line 78 has a third monitor startup period that overlaps the second monitor startup period and some of the stabilizing first graph line 70 of the low power computer unit 22 and the second graph line 74 of the first monitor 14. The third monitor startup period overlaps the second monitor startup period in time by a degree governed by the third delay period DP3. The total power peak at all times (t) is designed not to exceed the maximum operational wattage (Wmax). The longer the third delay period DP3, the shorter the overlap between the third monitor startup period and the second monitor startup period. Within the overlap, the total power consumption ($W_{TOTAL}$) is the sum of the power consumption of the low power computer unit 22, the power consumption of the first monitor 14, the power consumption of the second monitor 16, and the power consumption of the third monitor 18, at any given time (t).

As the third monitor powers up, the demands of power decrease. This is shown where the fourth graph line 78 of the third monitor's power consumption reaches a peak and begins to descend. A fourth delay period DP4 is set. At the fourth delay period DP4 after startup, the screen startup for the fourth monitor 20 begins. As the fourth monitor 20 is awakened and begins to power up, it creates the power consumption profile represented by a fifth graph line 80. The fourth monitor startup period overlaps the third monitor startup period in time by a degree governed by the fourth delay period DP4. The total power peak at all times (t) is designed not to exceed the maximum operational wattage (Wmax). The longer the fourth delay period DP4, the shorter the overlap between startup periods. Within the overlap, the total power consumption ($W_{TOTAL}$) is the sum of the power consumption of the low power computer unit 22, the power consumption of the first monitor 14, the power consumption of the second monitor 16, the power consumption of the third monitor 18, and the power consumption of the fourth monitor 20 at any given time (t).

From the above description, it will be understood that a powered device containing multiple monitors or other powered components can be powered on and operated over a single PoE cable 42, even if the combined peak power requirements of all the components exceeds the power rating of the PoE system 12. This is accomplished by setting a maximum wattage threshold and staggering the startup of the various components so that at any time (t), the total power draw ($W_{TOTAL}$) is less than the maximum wattage threshold (Wmax). By having the ability to alter the delay periods between component startups, the overall power management system can be adjusted to work for different maximum wattage thresholds, provided the combined average power draw of all components does not exceed the maximum wattage threshold.

Figure 6:
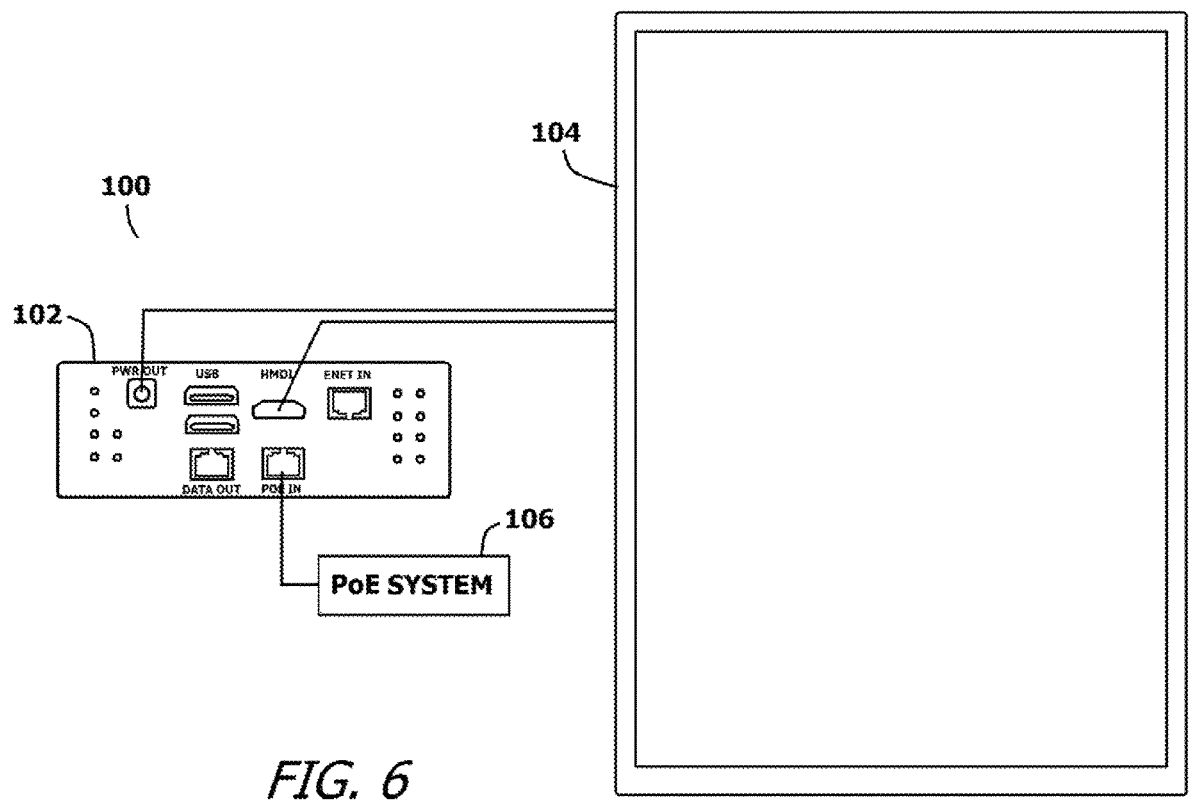
FIG. 6 shows an alternate embodiment of a powered device in the form of a commercial display that contains a low power computer unit and one large display monitor.
Figure 7:
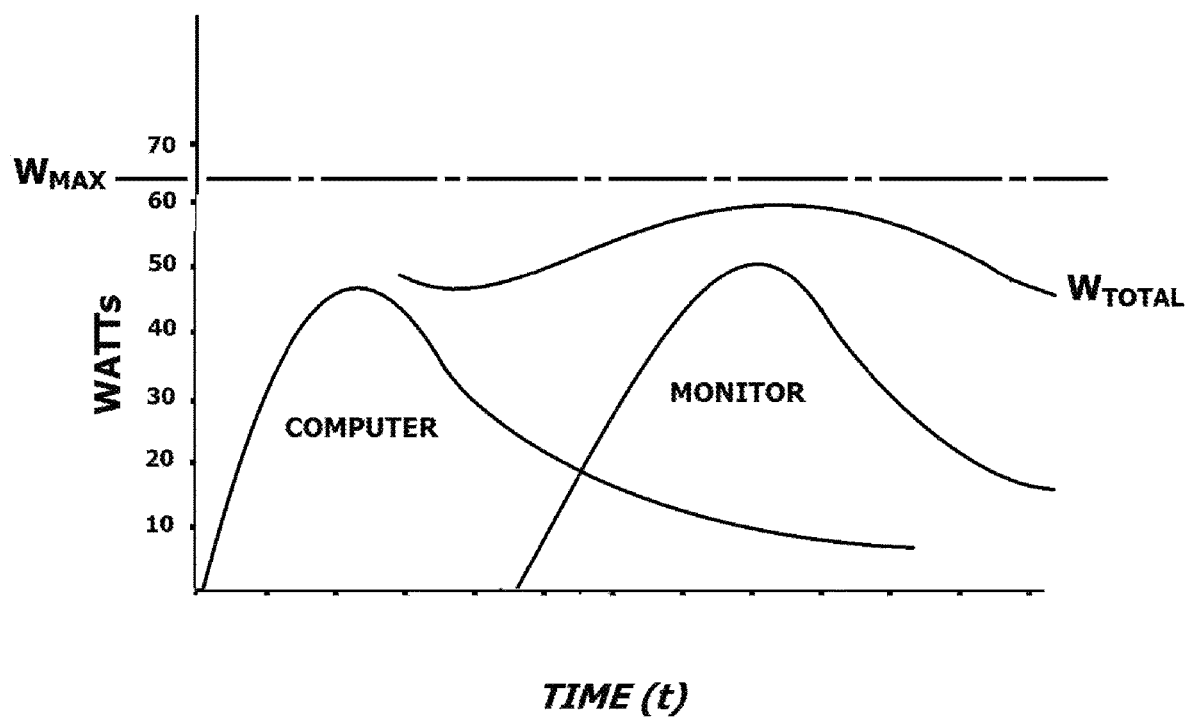
FIG. 7 shows a graph displaying the power consumption rate for the low power computer unit and the display monitor of FIG. 6.

In the initial embodiment, multiple monitors were shown. Multiple monitors can be replaced with one or more large monitors, provided that the average operational wattage of the monitor and the average operational wattage of the computer unit does not exceed the wattage available through the PoE system. Referring to FIG. 6 and FIG. 7, an alternate commercial display system 100 is shown that has a low power computer unit 102 and a single large display monitor 104. As can be seen, the power requirements of the display monitor 104 may exceed the power requirements of the computer unit 102. This can be accomplished provided that the average power requirements of the computer unit 102 and the average power requirements of the display monitor 104 do not add up to be higher than the power available through the PoE system 106. This can be accomplished by delaying the start of the display monitor 104 until the computer unit 102 has completed its startup protocols. Furthermore, various elements of the display monitor 104, such as resolution and brightness can be gradually increased overtime to lessen the overall power requirements at any one time.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A powered device for use in a Power-over-Ethernet system, wherein the Power-over-Ethernet system provides a mixed power and data signal to the powered device through a single PoE cable, said powered device, comprising:
   a plurality of display monitors;
   a computer unit containing a microprocessor, said computer unit having an input port, a power output port, and at least one video signal output port, wherein said input port receives said PoE cable and said mixed power and data signal,
   said computer unit containing a splitter circuit for separating a power signal and a data signal from said mixed power/data signal, wherein said power signal is used to power said computer unit and is also directed to said power output port, and
   wherein said microprocessor receives said data signal and generates display signals for said plurality of display monitors that are directed to said at least one video signal output port,
   wherein said plurality of display monitors are connected to said power output port of said computer unit so that said plurality of display monitors are powered solely by said power signal that is output by said computer unit; and
   wherein said plurality of display monitors are connected to said at least one video signal port so that said plurality of display monitors receive said display signals.

2. The powered device according to claim 1, wherein said microprocessor in said computer unit and each of said plurality of display monitors follows a staggered start procedure wherein said microprocessor and each of said plurality of display monitors power up at different times.

3. The powered device according to claim 1, wherein said splitter circuit is part of a splitter circuit board within said computer unit.

4. The powered device according to claim 3, wherein said input port for receiving said PoE cable is connected to said splitter circuit board and said splitter circuit board includes said power output port that receives said power signal and a data output port that receives said data signal.

5. The powered device according to claim 4, wherein said microprocessor is supported by a motherboard within said computer unit.

6. The powered device according to claim 5, wherein said motherboard includes a data input port and said at least one video signal port for outputting said display signals to said plurality of display monitors.

7. The powered device according to claim 6, wherein said splitter circuit board and said motherboard are separate and distinct boards within said computer unit.

8. The powered device according to claim 6, wherein said computer unit has a heat conductive housing that contains heat exchange fins on at least one exterior surface thereof.

9. The powered device according to claim 8, wherein said housing includes a connector panel, wherein said power output port and said data output port of said splitter circuit board, and said data input port and said at least one video signal port of said motherboard, are all accessible on said connector panel.

10. The powered device according to claim 8, wherein said microprocessor directly contacts said housing, wherein said housing absorbs and dissipates heat generated by said microprocessor.

11. The powered device according to claim 9, further including a jumper cable that connects to said connector panel, external of said computer unit, for interconnecting said data output port of said splitter circuit board to said data input port of said motherboard.

12. A powered device for use in a Power-over-Ethernet system, wherein the Power-over-Ethernet system provides a mixed power and data signal to the powered device through a single PoE cable, said powered device, comprising:
  at least one display monitor;
  a computer unit having a housing that holds a splitter circuit board and a microprocessor motherboard, wherein said splitter circuit board receives said mixed power and data signal and separates a power signal and a data signal from said mixed power and data signal, wherein said power signal is used to power said computer unit and is also directed to a power output port and said data signal is directed to said microprocessor motherboard, wherein said microprocessor motherboard generates display signals that are directed to at least one video signal port;
  wherein said at least one display monitor is connected to said power output port of said computer unit so that said at least one display monitor is powered solely by said power signal output; and
  wherein said at least one display monitor is connected to said at least one video signal port so that said at least one display monitor receives said display signals.

13. The powered device according to claim 12, wherein said computer unit and said at least one display monitor have a staggered start procedure wherein said computer unit and said at least one display monitor power up at different times.

14. The powered device according to claim 12, wherein said splitter circuit board includes an input port for receiving said PoE cable, a power output port and a data output port that receives said data signal.

15. The powered device according to claim 14, wherein said microprocessor motherboard includes a data input port for receiving said data signal from said splitter circuit board and said at least one video signal port.

16. The powered device according to claim 15, wherein said splitter circuit board and said microprocessor motherboard are separate and distinct boards within said computer unit.

17. The powered device according to claim 16, wherein said housing includes a connector panel, wherein said power output port and said data output port of said splitter circuit board, and said data input ports and said at least one video signal port of said microprocessor motherboard, are all accessible on said connector panel.

18. The powered device according to claim 17, further including a jumper cable, external of said computer unit, that connects to said connector panel for interconnecting said data output port of said splitter circuit board to said data input port of said microprocessor motherboard.

19. The powered device according to claim 12, wherein said computer unit has a heat conductive housing that contains heat exchange fins on at least one exterior surface thereof that dissipate heat generated by said microprocessor motherboard.

* * * * *